No. 720,769. PATENTED FEB. 17, 1903.
W. H. WOODWORTH.
SPRING PLATE NUT LOCK.
APPLICATION FILED MAY 3, 1902.
NO MODEL.
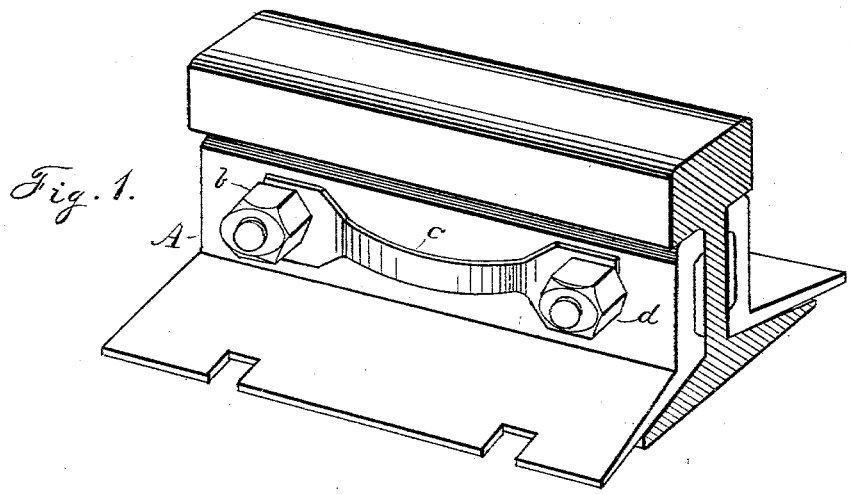
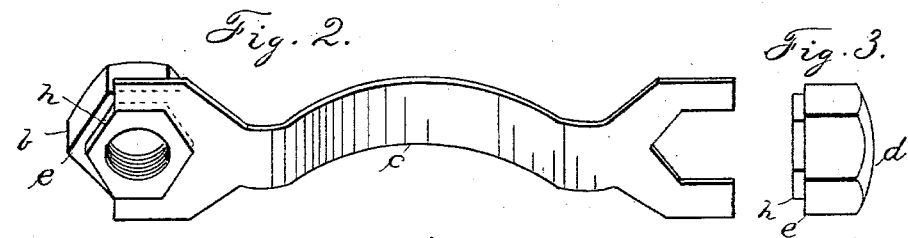
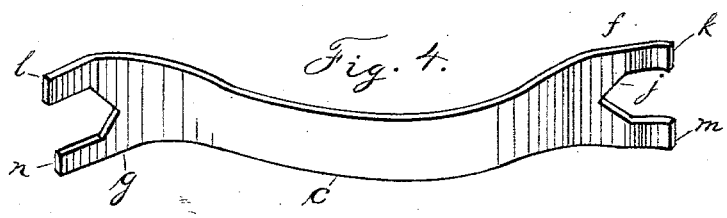
WITNESSES:
Mary E. Coyner
Frank Coyner
INVENTOR
Will H. Woodworth
BY
Thomas P. Simpson
ATTORNEY

UNITED STATES PATENT OFFICE.

WILLIAM H. WOODWORTH, OF DELAWARE, OHIO.

SPRING-PLATE NUT-LOCK.

SPECIFICATION forming part of Letters Patent No. 720,769, dated February 17, 1903.

Application filed May 3, 1902. Serial No. 105,835. (No model.)

*To all whom it may concern:*

Be it known that I, WILLIAM H. WOODWORTH, a citizen of the United States, residing at Delaware, in the county of Delaware and State of Ohio, have invented certain new and useful Improvements in Spring-Plate Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in nut-locking devices, and is practical where two nuts situated near each other are to be locked, and is especially applicable to the nuts of railway-rail joints.

The advantages I desire to obtain by a nut-locking device are twofold. First and most important is to absolutely prevent the nuts from turning, and thereby becoming unscrewed from the bolt; second, by a spring device to take up any looseness of the bolt that may be produced by wear of the surfaces of the parts of the joint. I attain these objects by means of the simple mechanism illustrated in the accompanying drawings, in which—

Figure 1 is a perspective view of a cross-section of a rail-joint. It represents the locking device $c$ as properly applied, locking the nuts $b$ and $d$. A shows the fish-plate with which the nuts $b$ and $d$ and the locking device $c$ when applied come in contact. Fig. 2 shows the opposite or inner side of the locking device $c$ and a nut $b$. Fig. 3 simply shows a side view of the special nut required with this locking device. Fig. 4 represents a perspective view of the device $c$, a view from above of the locking device as in position when applied.

Similar letters refer to similar parts throughout the views.

This special nut, Fig. 3, is best made hexagonal or six-sided, although it is not necessary that the nut be made with six sides. This nut must be constructed with a shoulder $e$ (see Figs. 2 and 3) on the side which is to be applied next the fish-plate A. This shoulder faces the locking-plate $c$ and may be made by rabbeting the edges of the side to be placed next the fish-plate, or the special nuts may be made very cheaply, like other nuts, by a drop-forge from a solid plate of iron. This shoulder $e$ is made just broad enough to serve the two purposes of holding the end of the locking device $c$ in position and of furnishing surface enough for the ends of the locking device $c$ to press out against. The ends of the locking device $c$, as hereinafter described, serve to keep the nuts tight even after looseness would have otherwise been produced by friction.

The locking device $c$ is a flat piece of spring-steel, the central part of which is curved away from the fish-plate, with angular jaw ends $g$ and $f$, each of which, wrench-like, grasps a nut at $h$ next the fish-plate beneath the shoulder $e$. Now it will be seen from Fig. 2 that the angular jaws engage four of the six sides of the nut, and as each end of the locking device is held immovable it follows that neither nut can turn while the locking device is properly applied.

The locking device $c$ is flattened or turned away from fish-plate at the end $g$, as shown in Fig. 4, while the other end $f$ is made with a slight curve, like the middle part. The end $f$ at its tips $k$ $m$ is bent, so as to present a slightly-concave outer surface to facilitate introduction. This latter end $f$ when applied presents a raised surface at $j$, which pushes out against the shoulder $e$ on the nut and keeps the nut tight even after there has been some wearing away of the adjoining surfaces. The raised tips $l$ and $n$ of the jaw end $g$ press up when applied against the shoulder $e$ of the nut and hold it firmly in place after wearing of the surface has taken place.

The locking device $c$ is applied as follows: The nuts are screwed onto the bolts (which are already locked by their elliptical shape of the head end fitting into a similar-shaped hole in the inner fish-plate) with their rabbeted sides fitting snug up against the fish-plate on the outside of the rails. It is necessary and always possible that the nut be stopped with one side standing parallel with the rail. The spring locking device $c$ is then grasped (better with a special tool) and its middle curve so increased that its ends $f$ and $g$ are brought nearer together. Then the wrench end $g$ is pushed on to grasp the nut $b$ at $h$ beneath the shoulder $e$. With the locking device still shortened by cramping its end $f$ is pushed down against the fish-plate and allowed to extend and engage the nut $d$ beneath its shoulder $e$. It thus locks both nuts $b$ and $d$ and by its peculiarly-bent ends, as heretofore described, holds the fish-plates snugly against the rails even after the surfaces become slighly worn.

The middle part of the nut-lock is curved and when applied stands out from the fish-plate A, so that it may be grasped with a special tool, cramped, and easily removed, or it may be pried out with the point of a crowbar, if so desired.

I am aware that a lock-plate bowed in the middle and forked at each end to embrace a nut has been used on fish-plates; but it is rigid and requires to be forced under the nut by a hammer, while my bow is elastic and has the spring-forks $e\ n\ j$, which allows the lock-plate to be put under the nuts and removed therefrom much more easily and expeditiously.

What I claim as new is—

A spring-plate nut-lock consisting of a plate having a convex spring in the middle and a fork with spring ends at each terminal, whereby it will operate and may be applied or removed in the manner described.

In testimony whereof I affix my signature in presence of two witnesses.

WILL. H. WOODWORTH.

Witnesses:
MARY E. COYNER,
FRANK COYNER.